(12) United States Patent
Gebhart et al.

(10) Patent No.: US 9,086,901 B2
(45) Date of Patent: Jul. 21, 2015

(54) MIGRATION OF APPLICATIONS FROM PHYSICAL MACHINES TO VIRTUAL MACHINES

(75) Inventors: Alexander Gebhart, Akazienweg (DE); Erol Bozak, Vinzentiusstrasse (DE)

(73) Assignee: SAP SE, Walldorf (DE)

( * ) Notice: Subject to any disclaimer, the term of this patent is extended or adjusted under 35 U.S.C. 154(b) by 1822 days.

(21) Appl. No.: 12/044,891

(22) Filed: Mar. 7, 2008

(65) Prior Publication Data
US 2009/0228629 A1  Sep. 10, 2009

(51) Int. Cl.
  *G06F 9/455*  (2006.01)
  *G06F 9/445*  (2006.01)
(52) U.S. Cl.
  CPC ............. *G06F 9/45533* (2013.01); *G06F 8/63* (2013.01)
(58) Field of Classification Search
  None
  See application file for complete search history.

(56) References Cited

U.S. PATENT DOCUMENTS

| | | | |
|---|---|---|---|
| 7,831,820 B2 * | 11/2010 | Winner et al. | 713/1 |
| 2006/0184935 A1 * | 8/2006 | Abels et al. | 718/1 |
| 2006/0277542 A1 * | 12/2006 | Wipfel | 717/174 |
| 2007/0006205 A1 * | 1/2007 | Kennedy et al. | 717/168 |
| 2009/0204961 A1 * | 8/2009 | DeHaan et al. | 718/1 |

OTHER PUBLICATIONS

Ashish Gupta et al., "Inferring the topology and traffic load of parallel programs running in a virtual machine environment", Job Scheduling Strategies for Parallel Processing, 10th International Workshop, JSSPP 2004, New York, NY, USA, Jun. 13, 2004, pp. 1-19.
Yingwei Luo, "A Three-phase Algorithm for Whole-System Live Migration of Virtual Machines", Conference on High Performance Networking and Computing; Proceedings of the 2007 Asian technology information program's (ATIP's) 3rd workshop on High performance computing in China: solution approaches to impediments for high performance computing, 2007, pp. 1-7.
Sunjay Kumar, "New Abstractions and Mechanisms for Virtualizing Future Many-Core Systems", A Thesis Submitted to the Faculty of Georgia Institute of Technology, Aug. 2008, pp. 1-131.

* cited by examiner

*Primary Examiner* — Gregory A Kessler
(74) *Attorney, Agent, or Firm* — Mintz Levin Cohn Ferris Glovsky and Popeo, P.C.

(57) ABSTRACT

Methods and apparatus, including computer program products, are provided for migrating applications from a physical machine to virtualization technology, such as virtual machines. In one aspect, there is provided a computer-implemented method. The method may include receiving, from an agent, information representative of at least one of an application or an operating system at a processor. An image may be created based on the received information. The image may provide a virtual machine including an application. The created image may be provided to a storage device. A virtualization manager may access the storage device and load the created image to implement a virtual machine including the application. Related apparatus, systems, methods, and articles are also described.

17 Claims, 4 Drawing Sheets

MIGRATION OF APPLICATIONS FROM PHYSICAL MACHINES TO VIRTUAL MACHINES

FIELD

The present disclosure generally relates to virtualization technology.

BACKGROUND

Computers have now become an integral part of our society both in business and in residential settings. Almost every business of sufficient size in Germany, the United States, and other developed countries has one or more computers to assist them in running their businesses. Similarly, many families in those countries now have computers at home that are used to run various applications including games.

Some attribute the popularity of computers to the Internet. The Internet provides people with a ready access to vast amounts of data. Many people now get their news, sports, stock, entertainment, and other information primarily from the Internet. Businesses have also embraced the Internet. The Internet provides the opportunity for computers to communicate instantly with other computers or individuals. Business processes that were once restricted to intranets and their users are now moving to the Internet. Accordingly, companies are moving more and more of their data to electronic forms. In addition, companies have amassed huge amounts of data in an effort to understand their business, improve performance, and build stronger employee, customer, and partner relationships.

Virtualization technology provides another mechanism for optimizing processing at a computer. Virtualization technology provides a software layer that when executed allows multiple virtual machines with, in some cases, different operating systems to run side-by-side with other virtual machines running on the same physical machine (e.g., a node, a computer, a processor, a server, and the like). The virtualization software provides a so-called "container" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines for the application servers. In both cases, fifty application servers are deployed, but with virtualization, the number of physical servers is reduced to twenty-five. Virtualization software may provide one or more of the following functions: running multiple virtual machines with different operating systems at the same time on the same physical machine; generating fully configured isolated virtual machines with a set of virtual hardware including an operating system and applications; saving, copying, and provisioning of virtual machines; and moving virtual machines from one physical machine to another physical machine for workload management.

When a virtual machine is used, the virtual machine may include an operating system. The operating system may include one or more applications. An operating system (OS) is the program that, after being initially loaded into the computer by a boot program, manages other programs on the computer. The other programs (also referred to as application programs or applications) may use the operating system by making requests for services through one or more application program interfaces (APIs) of the operating system. An application may perform one or more specific functions (or tasks) directly for a user or, in some cases, another program. For example, a virtual machine may include an operating system, such as Linux or Windows Vista, and one or more application programs, such as a browser, all of which operate in the so-called "container" provided by the virtual machine.

In some cases, the virtual machine may also include some data for use by the application. When this is the case, the virtual machine may be referred to as a so-called "virtual appliance." The phrase "virtual appliance" refers to a type of virtual machine including an application, an operating system, and data (e.g., application data, configuration information, drivers, and etc.) to enable simplification of the installation and the configuration process associated with running the application. An example of a virtual appliance is the MediaWiki software that powers Wikipedia, which is available as a virtual appliance. The MediaWiki appliance contains all the necessary software, including operating system, database, and MediaWiki, to run a wiki installation as a so-called "black box."

SUMMARY

The subject matter disclosed herein provides methods and apparatus, including computer program products, for migrating one or more applications from a physical machine to a virtual machine.

In one aspect, there is provided a computer-implemented method. The method may include receiving, from an agent, information representative of at least one of an application or an operating system at a processor. An image may be created based on the received information. The image may provide a virtual machine including an application. The created image may be provided to a storage device. A virtualization manager may access the storage device and load the created image to implement a virtual machine including the application.

The subject matter described herein may be implemented to realize the advantage of simplifying the implementation of virtual machines.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
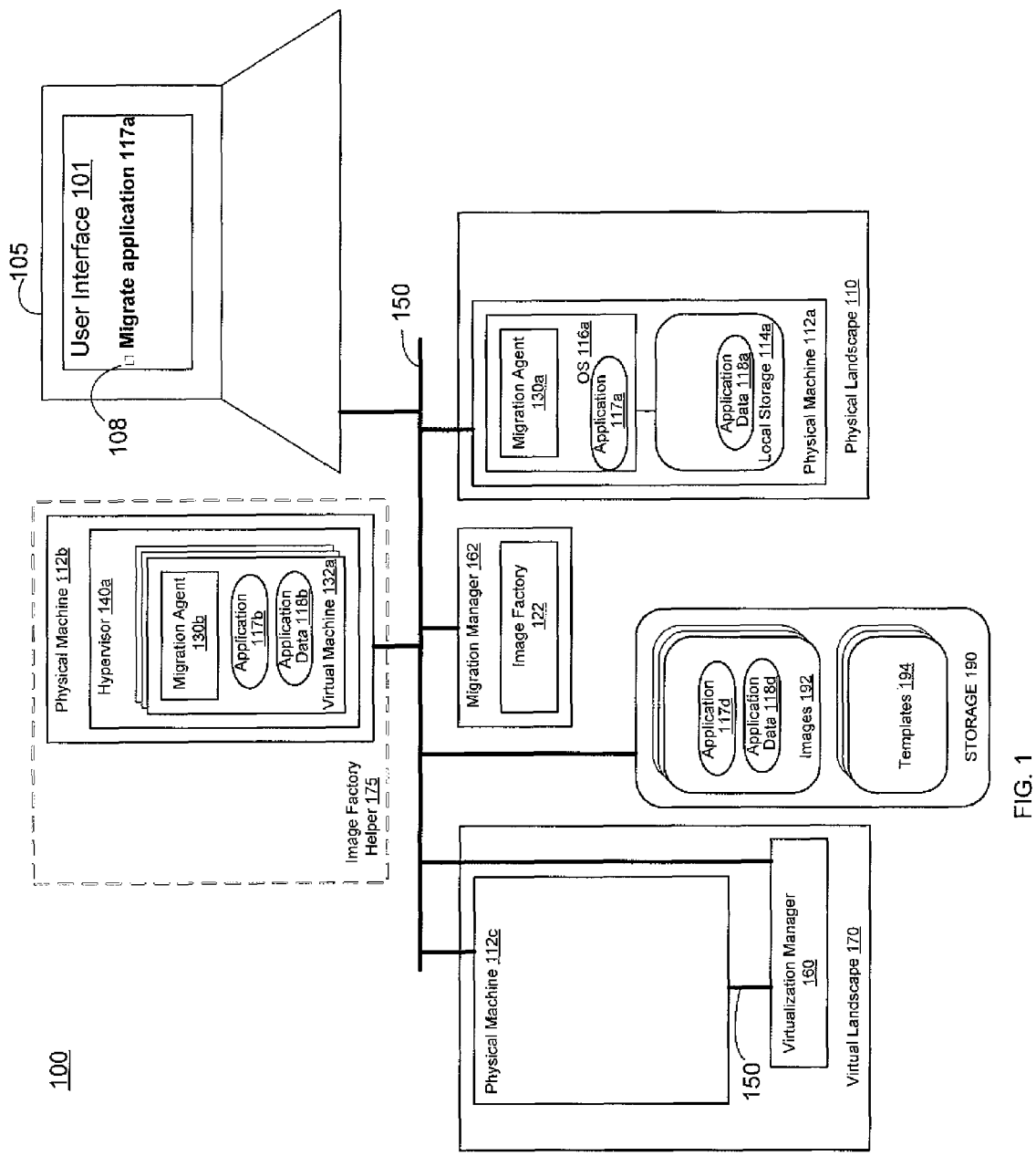
FIG. 1 depicts a block diagram of a system 100 for migrating an application from a physical machine to a virtual machine.

Like labels are used to refer to same or similar items in the drawings.

DETAILED DESCRIPTION

Virtualization is a software layer that decouples physical resources from the operating system. This allows isolation of heterogeneous operating systems that can concurrently run on the same physical machine and enables sharing of the physical hardware resources among the operating systems. Although it provides many benefits, virtualization has not been widely adopted in the industry. One reason for the slow adoption of virtualization may be the operational costs in terms of time and money to migrate existing applications on physical machines to virtual machines. For example, in an infrastructure, i.e., a system, including hundreds, thousands, if not millions of applications, migrating applications would require a re-installation onto each individual virtual machine an endeavor that is clearly very time consuming and, as a consequence, very expensive.

The subject matter described herein provides a migration process and system for transferring applications running on physical machines to virtual machines.

FIG. 1 depicts a system 100 for migrating applications running on physical machines to virtual machines. System 100 includes a migration manager 162 for managing the migration of applications, such as application 117a, and application data 118a from a physical landscape, i.e., system 110, to a virtual landscape 170, all of which are coupled by a network, such as network 150. System 100 also includes a computer 105 including a user interface 101 for enabling a user to select an application, such as application 117a, for migration from a physical machine to a virtual machine.

A physical landscape 110 refers to a system of one or more physical machines (e.g., processors, computers, servers, blades, and the like) capable of hosting one or more of the following: applications, such as application 117a; operating systems, such as operating system 116a; and data, such as application data 118a for use by applications and/or operating systems. The physical machine 112a may further include local storage 114, such as a hard drive, memory, and the like, for storing application data 118a.

The virtual landscape 170 represents one or more virtual machines capable of hosting applications being migrated from physical landscape 110. The one or more virtual machines may be hosted on one or more physical machines, such as physical machine 112c. FIG. 1 depicts that none of the applications from physical landscape 110 have been migrated to virtual landscape 170 since virtual landscape 170 at FIG. 1 does not yet include any virtual machines The virtual landscape 170 may further include a virtualization manager 160 for managing one or more virtual machines. The virtualization manager 160 may perform one or more of the following functions: running multiple virtual machines with different operating systems at the same time on the same physical machine; generating fully configured isolated virtual machines with a set of virtual hardware, an operating system, and applications; saving, copying, and provisioning of virtual machines; and moving virtual machines from one physical machine to another physical machine for workload management.

In some implementations, to migrate an application, such as application 117a, from physical machine 112a to virtual machines, a user interface may be used to select an application. For example, user interface 101 may be used to select 108 application 117a for migration. When this is the case, user interface 101 may provide to migration manager 162 an indication including information that application 117a has been selected for migration.

User interface 101 may be implemented as any type of interface that enables interaction with migration manager 162. For example, user interface 101 may be implemented as a browser (e.g., Netscape Navigator) or a client application to interface with (and/or access) migration manager 162.

The migration manager 162 uses one or more migration agents, such as migration agent 130a, to create images of the physical machine being transferred, which in FIG. 1 would correspond to physical machine 112a. As used herein, the term "image" refers to data representative of a copy of the implementation of an application at a physical machine. For example, the image may include a copy of the application, the configuration of the application, the operating system, the configuration of the operating system, the configuration of the physical machine (e.g., processor capacity or type, memory capacity, storage capacity, and network bandwidth, i.e., bandwidth between the network and the physical machine), and a virtual machine. An image may be stored and later accessed to allow execution at another location.

A migration agent, such as migration agent 130a, may be implemented as a program, which receives (e.g., access, retrieve, monitor, etc.) information representative of operating system 116, an application 117a, physical machine 112a, and the like. In some implementations, migration agent 130a is installed on physical machine 112a as part of operating system 116a, although migration agent 130a may be implemented in other locations as well. For example, migration agent 130a may be implemented to run in (e.g., as part of) operating system 116a and receive information representative of the operating system 116a, application 117a, physical machine 112a, and the like. Migration agent 130a may receive such information and then forward any received information to migration manager 162.

The migration manager 162 includes an image factory 122 for creating images from the information received from migration agent 130a and for storing the created images in storage 190 (e.g., a hard drive, memory, or the like) for later access and use. Image factory 122 includes methods for creating images using one or more templates 194 and the information received from the migration agent, such as migration agent 130a.

The templates 194 may include information to enable the creation of a virtual machine. In some implementation, each type of operating system, e.g., Java, Linux, Windows Vista, and the like, may have one or more corresponding templates stored as templates 194. For example, a template may include information to implement an operating system at a virtual machine, information required to implement an application at a virtual machine, the processing capacity required by a virtual machine, a memory capacity required by a virtual machine, a storage capacity required by a virtual machine, and a network bandwidth, i.e., bandwidth from a virtual machine to a network. Each of the templates 194 may also include other data for configuring a virtual machine including one or more of the following: an Internet Protocol (IP) address for a virtual machine, a media access control (MAC) address for a virtual machine, an address type, such as dynamic host configuration protocol (DHCP), a subnet mask, a location of a default gateway, and any other information which may be used to configure and run a virtual machine, an application, and an operating system.

Migration manager 162 may use a so-called "image factory helper" 175, which is simply another physical machine 112b (e.g., a spare physical machine) used to configure as well as refine the images created by image factory 122. The image factory helper 175 is thus loaded with an image, and that image is further configured to enable the image to be loaded onto another physical machine and executed to provide a virtual machine including the application being migrated.

Network 150 may be any type of communications mechanism and may include, alone or in any suitable combination, intra-process communications, the Internet, an intranet, or any other communication mechanism (e.g., a telephony-based network, a local area network (LAN), a wide area network (WAN), a dedicated intranet, a wireless network, and a bus). Moreover, network 150 may be embodied using bidirectional, unidirectional, or dedicated communication links. Network 150 may also support standard transmission protocols, such as Transmission Control Protocol/Internet Protocol (TCP/IP), Hyper Text Transfer Protocol (HTTP), SOAP, WS-RM, RPC, or other protocols.

Figure 2:
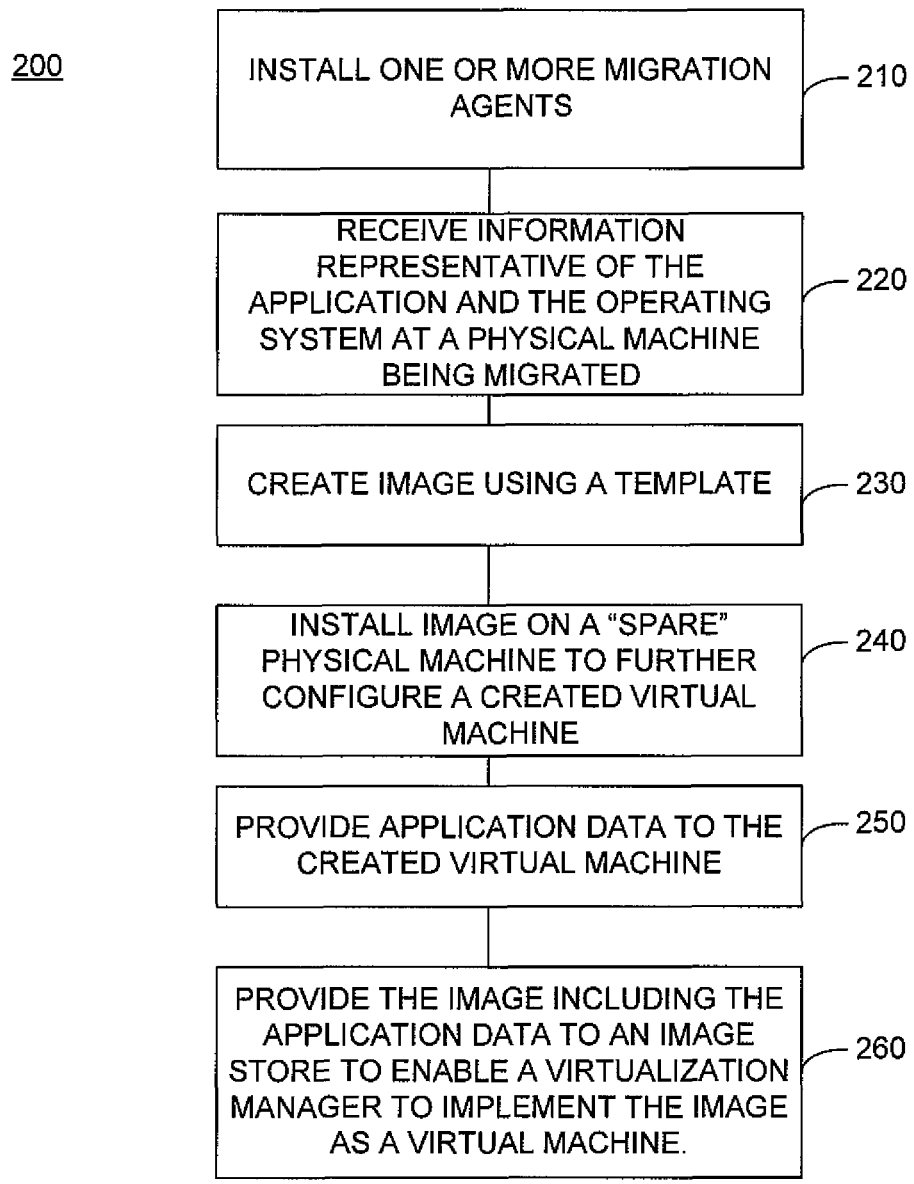
FIG. 2 depicts a process 200 for migrating an application from a physical machine to a virtual machine.

FIG. 2 depicts a process 200 for transferring applications running on physical machines to virtual machines.

At 210, one or more migration agents, such as migration agent 130*a* may be installed at a physical machine 112*a*. To install the agent, migration manager 162 may install migration agent 130*b* either in a physical machine or, alternatively, as part of an operating system. The migration agent 130*a* may be installed in the operating system in a variety of ways including as an upgrade, a patch, or as a hot deployment feature.

The migration manager 162 may command the installed migration agent 130*a* to analyze the underlying operating system 116*a* and hardware characteristics of physical machine 112*a* to create a profile of physical machine 112*a*. The profile reflects the state of the physical machine 112*a* and may include operating system characteristics (e.g., an operating system name, an operating system version, an operating system patch level, and the like); operating system configuration (e.g., user accounts, network configuration, and the like); hardware characteristics of physical machine 112*a* (e.g., devices at physical machine 112*a*, such as memory, central processing unit, network cards, graphics card, display adapters, modems, ports, game cards, sound cards, bus controllers, storage devices, and the like).

At 220, migration manager 162 receives the profile information created by migration agent 130*a*. At 230, image factory 122 creates an image for that received profile using a template, such as template 194. The template may provide information to configure a virtual machine using, for example, a specific type of operating system. A template, in this case, is a pre-created image that is used when new images of the physical machines are created (e.g., a copy used to create images of the physical machines). The template(s) typically simplify the image creation process since, for example, the operating system may already be installed or certain software components may already be installed which are also available at the physical machine(s). For example, if there are no templates available, the migration manager creates an image and installs the operating system(s) and any other required software.

At 240, the created image for physical machine 112*a* is installed at image factory helper 175, which in this case is physical machine 112*b*. The installed image is executed on physical machine 112*b* to further configure the created image. The migration manager 162 interacts with migration agent 130*b* of the instantiated virtual machine 132*a* in physical machine 112*b* to configure that virtual machine based on the profile. For example, since a virtual machine is created from the template, the template typically has the same so-called "look" as the physical machine. At 240, the virtual machine can be used to migrate the applications and/or data from the physical machine to the virtual machine.

At 250, migration agent 130 initiates a migration of application data 118*a* at physical machine 112*a* to the instantiated virtual machine 132*a*. A migration refers to a move, but in some cases, the migration may be implemented as at least one of the following: a copy, a transfer, a load, and the like.

At 260, migration manager 162 provides an image of the virtual machine 132*a* including application data 118*b* and application 117*b* to image factory 122 for storage at 190 as image 192. Virtualization manager 160 may then migrate that image to physical machine 112*c* to implement a virtual machine.

Figure 3:
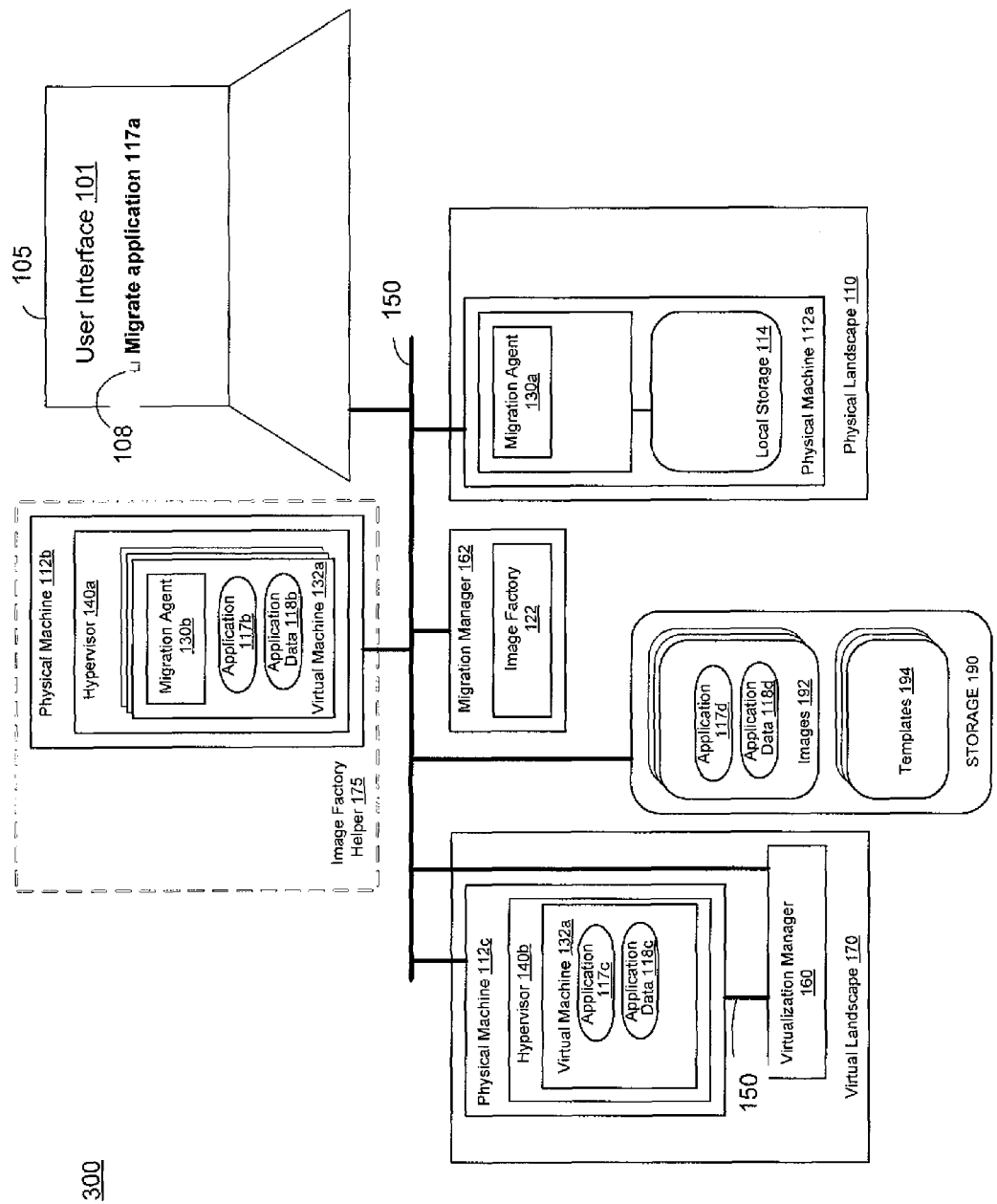
FIG. 3 depicts the system of FIG. 1 after an application has been migrated to a virtual machine.

FIG. 3 depicts system 100 after virtualization manager 160 migrates image 192 on to physical machine 112*c*. The image 192 provides one or more of the following: virtual machine 132*a*, application 117*c*, and application data 118*c*. Virtualization manager 160 may also provide a hypervisor, such as hypervisor 140*b*. In some cases, a hypervisor, which refers to a program used to manage a virtual machine, may be used as an operating system. The application 117*c* of FIG. 3 is similar, if not the same, as applications 117*a* and *b* of FIG. 1. However, unlike application 117*a*, application 117*c* runs on virtual machine 132*a* by virtue of process 200.

In some implementations, migration manager 162 commands migration agent 130*a* to instruct an operating system, such as operating system 116*a*, to delete the migrated application 117*a* and application data 118*a*. However, in other implementations, migrated application 117*a* and application data 118*a* remain on physical machine 112*a*.

Figure 4:
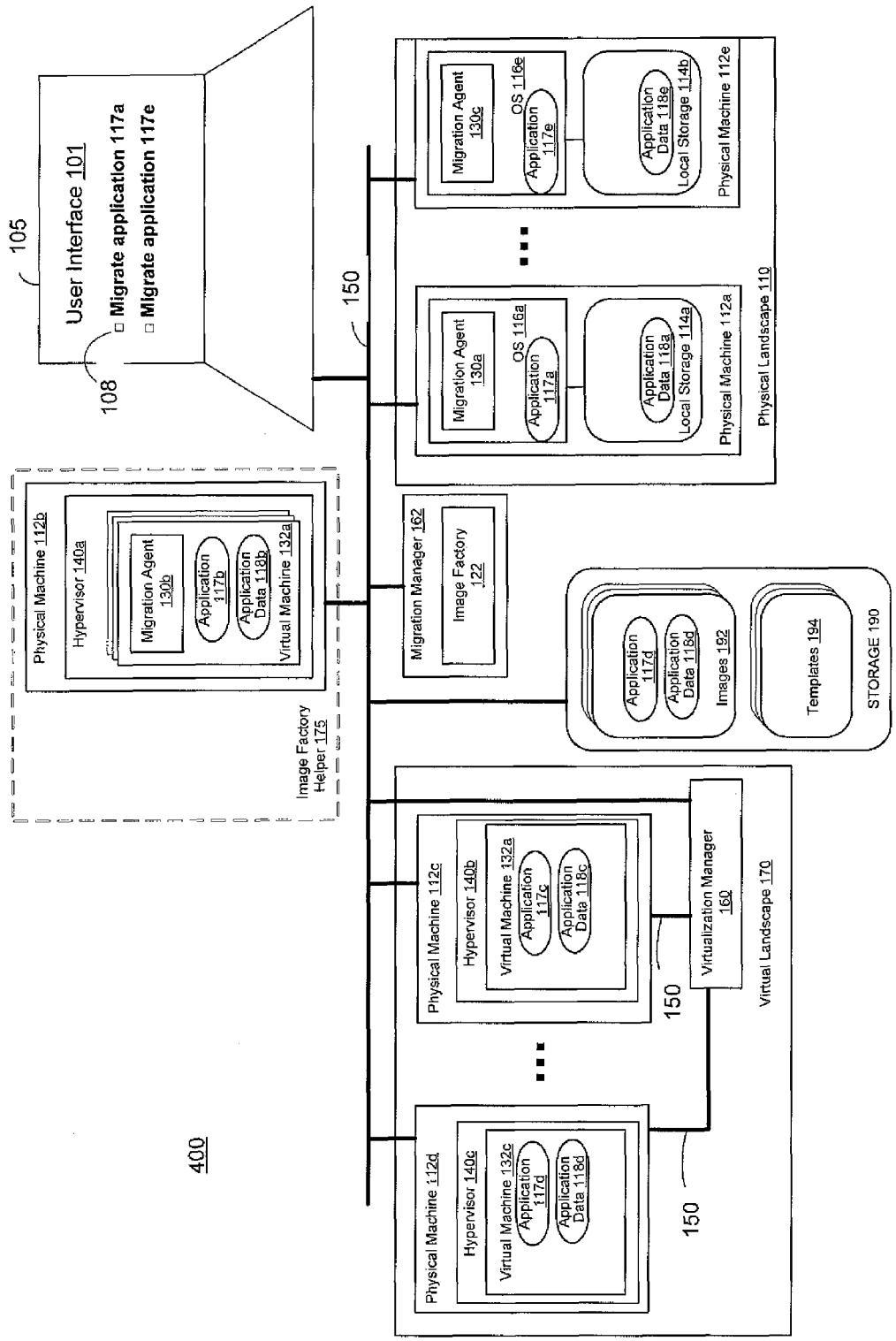
FIG. 4 depicts another block diagram of a system 400 for migrating applications from physical machines to virtual machines.

FIG. 4 depicts a system 400 for migrating applications running on physical machines to virtual machines. System 400 is similar to systems 100 and 300 of FIGS. 1 and 3. However, system 400 includes a plurality of applications, such as applications 117*a* and *e*, and a plurality of migration agents 130*a* and *c*. Each of applications 117*a* and *e* may be selected 108 (e.g., by a user interface 101) to be migrated to virtual machines, such as virtual machines 132*a* and *c*. Moreover, the migration may be described using the process 200 described above.

At 210, migration manager 162 may install migration agents 130*a* and *c*. At 220, migration manager 162 receives the profile information created by migration agent 130*a*. At 230, image factory 122 may create an image for each of the information received from each of the migration agents 130*a* and *c*. Moreover, the creation of the image may be based on a template, such as one of the templates 194. At 240, the created images for each of the physical machines 112*a* and *e* is installed at image factory helper 175. The installed images are executed on one or more physical machines, such as physical machine 112*b*, to further configure the created images. The migration manager 162 interacts with the migration agent of the instantiated virtual machine to configure that virtual machine. At 250, migration agent 130 initiates a migration of application data 118*a* and *e*. At 260, migration manager 162 provides the created images of the virtual machines to image factory 122 for storage at 190 as one of the images 192. Virtualization manager 160 may then migrate one of those images to a physical machine at virtual landscape 170 to instantiate (i.e., execute) the virtual machine corresponding to the image.

In some implementation, applications 117*a*-*e* may correspond to any program, including a browser, word processing application, a customer relationship management (CRM) application, an enterprise resource planning (ERP) application, a product lifecycle management application, a supply chain management (SCM) application, a supplier relationship management application, as well as any other application.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Moreover, although the subject matter described above was described with respect to virtual machines, the virtual machines may be implemented as virtual appliances. Furthermore, in some implementations migration manager 162 is implemented as part of another program, such as a virtualization manager, operating system, and the like.

The foregoing description is intended to illustrate but not to limit the scope of the invention, which is defined by the scope of the appended claims. Other embodiments are within the scope of the following claims.

What is claimed:

1. A non-transitory computer-readable medium containing instructions to configure a processor to perform a method, the method comprising:
   receiving, from an agent, information representative of at least one of an application and an operating system at the processor;
   creating, based on the received information, an image providing a virtual machine including the at least one of the application and the operating system;
   providing the created image to a storage device accessible by a virtualization manager for implementing the created image as a virtual machine including the at least one of the application and the operating system; and
   installing the created image on a spare processor, wherein a migration manager interacts with a migration agent included in the virtual machine at the spare processor to further configure the virtual machine based on a profile, wherein the migration manager instructs the migration agent to configure the created image based on the profile.

2. The non-transitory computer-readable medium of claim 1, further comprising:
   installing the agent in at least one of the operating system and the processor.

3. The non-transitory computer-readable medium of claim 1, wherein receiving further comprises:
   receiving information representative of one or more of the following: an operating system name, an operating system version, an operating system patch level, a user account, a network configuration, and a hardware characteristic.

4. The non-transitory computer-readable medium of claim 1, further comprising:
   installing the created image on the spare processor before providing the created image to the storage device.

5. The non-transitory computer-readable medium of claim 4, further comprising:
   providing application data to the spare processor.

6. The non-transitory computer-readable medium of claim 1, further comprising:
   implementing the created image as the virtual machine, the implemented created image retrieved from the storage device.

7. A computer-implemented method comprising:
   receiving, from an agent, information representative of at least one of an application and an operating system at the processor;
   creating, based on the received information, an image providing a virtual machine including the at least one of the application and the operating system; and
   providing the created image to a storage device accessible by a virtualization manager for implementing the created image as a virtual machine including the at least one of the application and the operating system; and
   installing the created image on a spare processor, wherein a migration manager interacts with a migration agent included in the virtual machine at the spare processor to further configure the virtual machine based on a profile, wherein the migration manager instructs the migration agent to configure the created image based on the profile.

8. The computer-implemented method of claim 7, further comprising:
   installing the agent in at least one of the operating system and the processor.

9. The computer-implemented method of claim 7, wherein receiving further comprises:
   receiving information representative of one or more of the following: an operating system name, an operating system version, an operating system patch level, a user account, a network configuration, and a hardware characteristic.

10. The computer-implemented method of claim 7, further comprising:
    installing the created image on the spare processor to further configure the created image before providing the created image to the storage device.

11. The computer-implemented method of claim 10, further comprising:
    providing application data to the spare processor.

12. The computer-implemented method of claim 7, further comprising:
    implementing the created image as the virtual machine, the implemented created image retrieved from the storage device.

13. A system comprising:
    at least one processor; and
    at least one memory,
    wherein the at least one processor and the at least one memory are configured to perform a method comprising:
    receiving, from an agent, information representative of at least one of an application and an operating system at the at least one processor;

creating, based on the received information, an image providing a virtual machine including the at least one of the application and the operating system; and providing the created image to a storage device accessible by a virtualization manager for implementing the created image as a virtual machine including the at least one of the application and the operating system; and installing the created image on the spare processor, wherein a migration manager interacts with a migration agent included in the virtual machine at the spare processor to further configure the virtual machine based on a profile, wherein the migration manager instructs the migration agent to configure the created image based on the profile.

14. The system of claim 13, further comprising:
installing the agent in at least one of the operating system and the processor.

15. The system of claim 13, wherein receiving further comprises:
receiving information representative of one or more of the following: an operating system name, an operating system version, an operating system patch level, a user account, a network configuration, and a hardware characteristic.

16. The system of claim 13, further comprising:
installing the created image on the spare processor before providing the created image to the storage device.

17. The system of claim 16, further comprising:
providing application data to the spare processor; and
implementing the created image as the virtual machine, the implemented created image retrieved from the storage device.

* * * * *